(12) United States Patent
Yu et al.

(10) Patent No.: US 8,935,731 B2
(45) Date of Patent: Jan. 13, 2015

(54) DISPLAY SYSTEM, TELEVISION APPARATUS AND OPERATING METHOD FOR APPLICATION IMPLEMENTING THEREOF

(75) Inventors: Yen-Po Yu, New Taipei (TW); Chih-Ho Chen, New Taipei (TW); Kuang-Cheng Chao, New Taipei (TW); Min-I Chen, New Taipei (TW); Chi-Heng Chang, New Taipei (TW)

(73) Assignee: AmTRAN TECHNOLOGY Co., Ltd., New Taipei (TW)

( * ) Notice: Subject to any disclaimer, the term of this patent is extended or adjusted under 35 U.S.C. 154(b) by 29 days.

(21) Appl. No.: 13/525,394

(22) Filed: Jun. 18, 2012

(65) Prior Publication Data
US 2013/0174193 A1 Jul. 4, 2013

(30) Foreign Application Priority Data
Dec. 29, 2011 (TW) .............................. 100149638 A

(51) Int. Cl.
*H04N 5/445* (2011.01)
*H04N 7/173* (2011.01)
*G06F 3/00* (2006.01)
*G06F 13/00* (2006.01)

(52) U.S. Cl.
USPC ............... 725/56; 725/37; 725/109; 725/110; 725/111; 725/112

(58) Field of Classification Search
USPC .................................. 725/109–113
See application file for complete search history.

(56) References Cited

U.S. PATENT DOCUMENTS

| | | | |
|---|---|---|---|
| 6,185,360 B1 * | 2/2001 | Inoue et al. | 386/248 |
| 6,529,680 B1 | 3/2003 | Broberg | |
| 6,661,472 B2 | 12/2003 | Shintani et al. | |
| 7,865,498 B2 | 1/2011 | Rodriguez | |
| 2002/0124071 A1 * | 9/2002 | Proehl et al. | 709/223 |
| 2004/0158856 A1 * | 8/2004 | Grooters et al. | 725/39 |
| 2008/0022322 A1 * | 1/2008 | Grannan et al. | 725/78 |
| 2008/0155613 A1 * | 6/2008 | Benya et al. | 725/89 |
| 2009/0031348 A1 * | 1/2009 | Vagnati | 725/39 |
| 2010/0175089 A1 * | 7/2010 | Seo et al. | 725/44 |
| 2012/0077535 A1 * | 3/2012 | Carpelan | 455/509 |
| 2013/0239148 A1 * | 9/2013 | Wilson et al. | 725/48 |

FOREIGN PATENT DOCUMENTS

| | | |
|---|---|---|
| CN | 101568015 | 10/2009 |
| WO | 2011039763 | 4/2011 |

OTHER PUBLICATIONS

"Office Action of Taiwan Counterpart Application", issued on Nov. 3, 2014, p. 1-8, in which the listed references were cited.

* cited by examiner

*Primary Examiner* — Nasser Goodarzi
*Assistant Examiner* — Fred Peng
(74) *Attorney, Agent, or Firm* — Jianq Chyun IP Office

(57) ABSTRACT

An operating method of application for the television apparatus is provided. Wherein, the operating method includes: receiving a channel selecting instruction; reading a channel list, the channel list includes a plurality of applications (APPs) and a plurality of physical channels corresponding to a plurality of channel numbers, wherein each of the APPs is assigned to one of the channel numbers respectively; mapping the channel selection instruction to one of the plurality of channel numbers in the channel list; and launching and executing a selected APP if the channel selection instruction is corresponding to the channel number of the selected APP.

15 Claims, 6 Drawing Sheets

DISPLAY SYSTEM, TELEVISION APPARATUS AND OPERATING METHOD FOR APPLICATION IMPLEMENTING THEREOF

CROSS-REFERENCE TO RELATED APPLICATION

This application claims the priority benefit of Taiwan application serial no. 100149638, filed on Dec. 29, 2011. The entirety of the above-mentioned patent application is hereby incorporated by reference herein and made a part of this specification.

BACKGROUND

1. Technical Field

The present invention relates to a television apparatus and a display system capable of displaying television programs and executing applications, and in particular, to an application implementation method for the television apparatus and the display system.

2. Related Art

With the improvement of electronic technology, the television apparatus is no longer just an entertaining device providing the viewing pleasure of the television programs. Since the televisions are digitalized in the present days, users can not only watch television programs or movies but also browse web pages or receive/send Emails with televisions which connect to Internet. Furthermore, various applications (APPs) with different functionalities may be installed into the televisions to perform a more comprehensive utility other than broadcasting television programs.

In the conventional art, the electronic devices such as televisions, display a graphical APP list to users by which the users can select and then execute an APP. In brief, users may control the cursor displayed on the electronic device via a remote controller, moving the cursor to their desired APP shown in the APP list and pressing a confirm button to launch the selected APP. In order to avoid confusion with the existing channel list of television programs, some of the televisions in the conventional art provide a switch button on the remote controller, so users can switch between the channel list and the APP list on the electronic device. However, the APP list in the conventional art must firstly be called before users can select and execute the APPs. Therefore, it is lack of an interface design for integrating the APP list with the existing channel list of television programs so the users can conveniently select the APPs or the physical channels in the same list.

SUMMARY

The present invention provides a television apparatus and an operating method for application thereof, which increases the convenience to the users in selecting and executing the application.

The present invention provides an operating method for selecting application implemented in a television apparatus, including: receiving a channel selecting instruction; reading a channel list, wherein the channel list includes a plurality of applications (APPs) and a plurality of physical channels corresponding to a plurality of channel numbers, wherein each of the APPs is assigned to one of the channel numbers respectively; mapping the channel selection instruction to one of the plurality of channel numbers in the channel list; and launching and executing a selected APP if the channel selection instruction is corresponding to the channel number of the selected APP.

In an embodiment of the present invention, wherein the plurality of channel numbers are assigned to the plurality of APPs according to an order of installations of the plurality of APPs.

In an embodiment of the present invention, the operating method for application further includes: receiving a mode setting instruction; and setting the channel list according to the mode setting instruction, wherein the channel list is set to include or not include the plurality of channel numbers assigned to the plurality of APPs.

In an embodiment of the present invention, wherein the step for launching and executing the selected APP includes: activating a time counting operation when receiving the channel selecting instruction and the channel selecting instruction is directed to the selected APP, if no any channel selecting instruction in a predetermined time period is received; launching the selected APP after the predetermined time period; and if receiving a confirmation instruction after receiving the channel selecting instruction, launching the selected APP.

In an embodiment of the present invention, wherein the plurality of channel numbers assigned to the plurality of APPs are negative numbers.

In an embodiment of the present invention, the operating method for application further includes: determining whether the selected APP is set to be monitored; and if the selected APP is set to be monitored, displaying an authentication request according to an authentication setting corresponding to the selected APP.

In an embodiment of the present invention, the operating method for application further includes: displaying an APP channel setting interface; receiving an APP channel setting instruction selecting part of the plurality of APPs; and enabling or disabling part of the channel numbers corresponding to the part of the plurality of APPs in the channel list.

The present invention provides a television apparatus, including a channel management module and an APP management module. The channel management module receiving a channel selecting instruction from an operating interface, the channel management module stores and reads a channel list including a plurality of applications (APPs) and a plurality of physical channels corresponding to a plurality of channel numbers, wherein each of the APPs are assigned to one of the channel numbers respectively. The APP management module is used to receive and install the plurality of APPs. Wherein the channel management module maps the channel selection instruction to a channel number in the channel list, and if the channel selection instruction is corresponding to the channel number of a selected APP, the channel management module launches the selected APP.

The present invention further provides a display system capable of displaying television programs and executing applications (APPs). The display system includes an operating interface, a channel management module and an APP management module. The channel management module receiving a channel selecting instruction from the operating interface, the channel management module reads a channel list including a plurality of applications (APPs) and a plurality of physical channels corresponding to a plurality of channel numbers, wherein each of the APPs is assigned to one of the channel numbers respectively. The APP management module receiving and installing the plurality of APPs, the APP management module storing settings of the plurality of APPs. Wherein the channel management module maps the channel selection instruction to a channel number in the channel list, and if the channel selection instruction is corresponding to the channel number of a selected APP, the channel management module launch the selected APP.

Based on the above, the present invention provides the channel list according to the APPs installed in the television apparatus for users to launch the APPs of the television apparatus, with the similar selecting method for selecting physical channels. As such, users of the television apparatus may manage and execute their desired APP with a custom selecting method similar to one for the physical channels. Such selecting method provides a conventional and convenient way for utilizing the APPs of the television apparatus.

In order to make the aforementioned and other features and advantages of the present invention more comprehensible, embodiments accompanying Figures are described in detail below. The present invention provides a television apparatus and an operating method for application thereof, which increases the convenience in executing the application.

DETAILED DESCRIPTION OF DISCLOSED EMBODIMENTS

Figure 1:
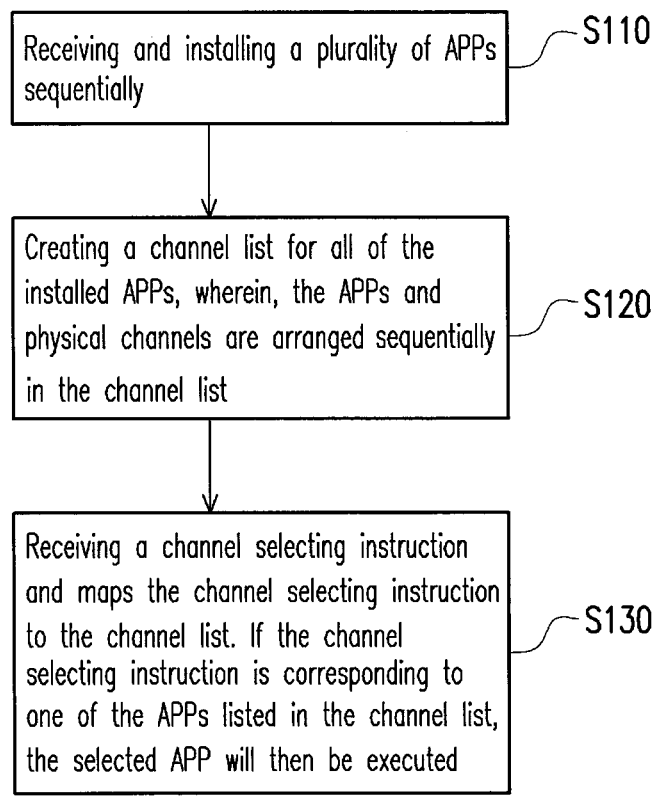
FIG. 1 is a flow chart illustrating an operating method for application of the television apparatus according to an embodiment of the present invention.

Referring to FIG. 1, FIG. 1 is a flow chart illustrating an operating method for application of the television apparatus according to an embodiment of the present invention. The operating method for application of the television apparatus including: step S110: receiving and installing a plurality of APPs sequentially. More specifically, users may operate the television apparatus to download different APPs from one or more APP stores. The APPs are sequentially downloaded to the television apparatus in the order of the users' selections. In addition, the APPs downloaded from the APP stores are mostly transferred to the television apparatus in a compressed file format. Therefore, after one of the APPs is downloaded, the television apparatus decompresses o the compressed file and then install the decompressed APPs into the television apparatus.

In the following step S120, the television apparatus creates a channel list for all of the installed APPs, wherein the APPs and physical channels are arranged sequentially in the channel list. Users may input a channel selecting instruction to switch between the physical channels or execute the APPs based on the channel list. The APPs included in the channel list are arranged in a sequence. In the present embodiment, the APPs downloaded and installed earlier are arranged in front of the APPs downloaded and installed comparatively later. In other words, the sequence of the APPs in the channel list is equal to the sequence of their installations.

In step S130, the television apparatus receives the channel selecting instruction inputted by users and maps the channel selecting instruction to the channel list. If the channel selecting instruction is corresponding to one of the APPs listed in the channel list, the selected APP will then be executed by the television apparatus. In other words, an input device (e.g. remote controller) may be operated to send a channel selecting instruction when users want to switch to an installed APP. Meanwhile, the television apparatus will launch the selected APP into execution according to the channel number of the APPs in the channel list and the received channel selecting instruction. In addition, if the channel selecting instruction received by the television apparatus is corresponding to a physical channel in the channel list, then the television apparatus is switched to the physical channel and display the TV program or video contents of the physical channel.

In order to describe operations in the embodiment of present invention in more detail, one of the present invention's embodiments is illustrated as follows.

Figure 2:
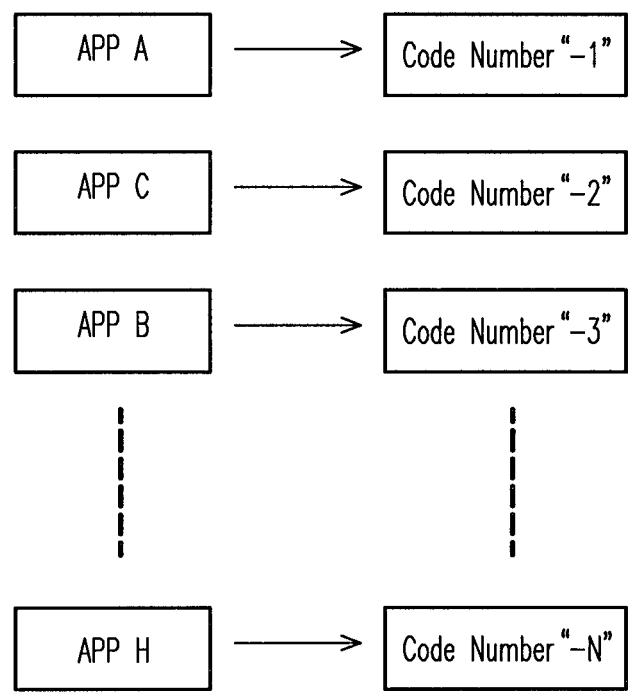
FIG. 2 illustrates an example of a sequence of the APPs according to an embodiment of the present invention.

Please referring to FIG. 2, FIG. 2 illustrates an example of the sequence of APPs in the channel list according to an embodiment of the present invention. The APP A to APP H indicate different APPs installed in the television apparatus separately and the order of the installations is: APP A→APP C→APP B→ . . . →APP H. Based on the order of the installations above, the television apparatus assigns an APP channel number to each of the APPs among APP A to APP H. In an embodiment, the channel number of APP A is assigned as "−1 (negative one)", the channel number of APP C is assigned to "−2", the channel number of APP B is assigned to "−3", and the rest of the APPs may be deduced by analogy. The channel number of APP H is assigned to "−N", wherein N is a positive integer. With the arrangement above, users may select an APP as selecting a physical channel via remote controller.

When the user wants to switch between APPs, the user may select an APP assigned to the previous channel of a currently executed APP by sending a channel selecting instruction selecting the channel number of the previous channel or sending a channel up instruction via the remote controller. For example, if the currently executed APP is APP C and the user selects the previous channel, the television apparatus will end the execution of APP C and launch APP A into execution according to the channel list shown in FIG. 2. Relatively, if users send a channel selecting instruction selecting the next channel of the currently executed APP C or the channel down instruction via the remote controller, the television apparatus will end APP C and then launch APP B into execution.

Figure 3:
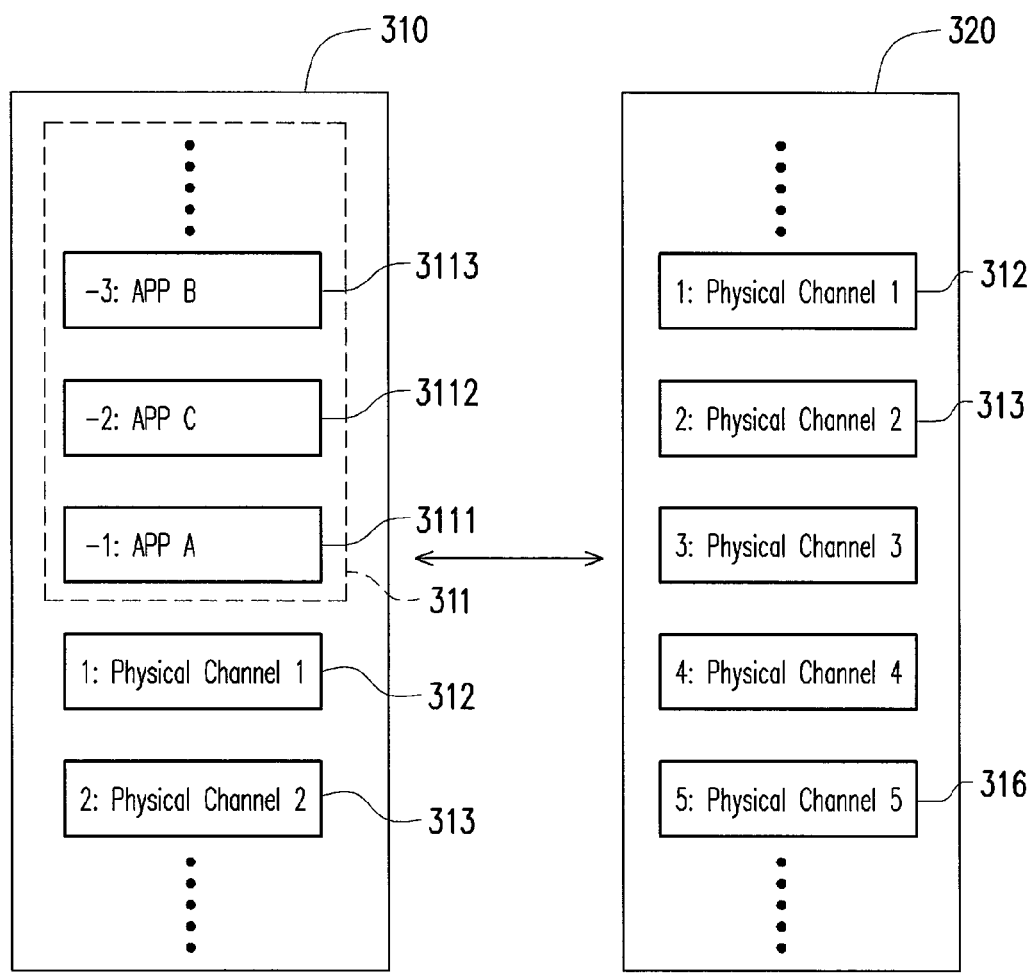
FIG. 3 illustrates the relation between the APP channels and the physical channels according to an embodiment of the present invention.

Please referring to FIG. 3, FIG. 3 illustrates the relationship between the APP channels and the physical channels according to an embodiment of the present invention. Referring to FIG. 3, a comprehensive mode channel list 310 includes: an APP channel list having a plurality of APP channels 3111 to 3113, physical channels 312, 313, and other physical channels (not shown in the figure). When the channel selecting instruction is sent to the television apparatus, the television apparatus will then switch to one of the physical channels 312 and 313 and display television program, or switch to one of the APP channels 3111 to 3113 to execute the selected APP according to the order of channels in the channel list 310. In other word, users may switch between the physical channels and the APP channels with the same channel selecting instruction selecting different channels, so maintaining an independent table for the APP channels is not necessary. As the result, users are not required to call the independent table of APPs every time before selecting an APP to launch.

Furthermore, if an user does not want to execute any APP but only want to watch the television program of the physical channel, the user may send a mode setting instruction via the remote controller to set the mode of the channel list. The television apparatus will be switched from the comprehensive mode channel list 310 to the traditional mode channel list 320. In the traditional mode channel list 320, only physical channels 312 to 316 are listed. That is, users can only select and watch the television programs of the physical channels 312 to 316 and the APP channels cannot be selected or switched to in this mode.

It should be noted that, users may arbitrarily switch between the comprehensive mode channel list 310 and the traditional mode channel list 320 by repeatedly sending the mode setting instruction. In other words, users may freely select the mode of the channel list as they desire.

Figure 4:
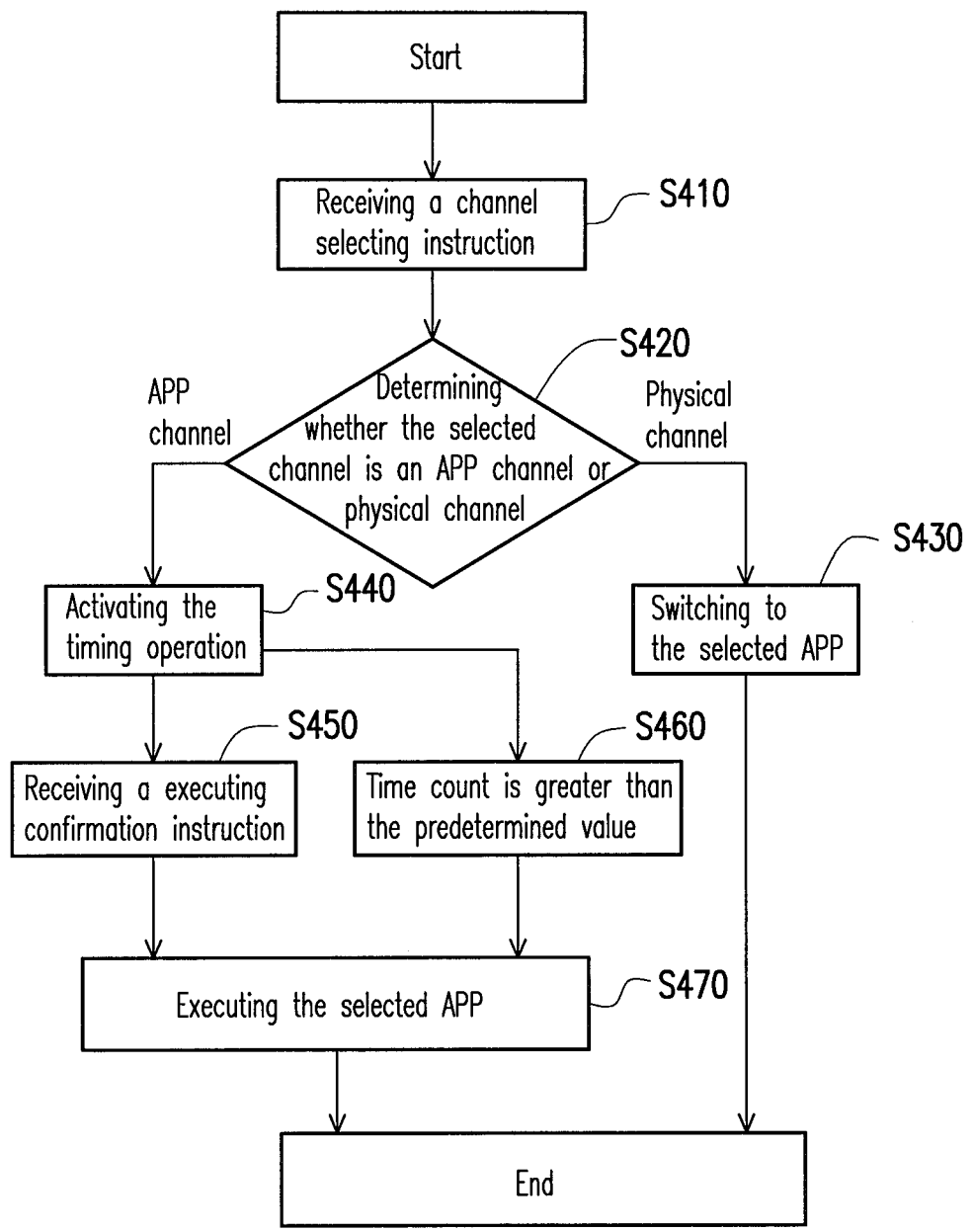
FIG. 4 is a flowchart illustrating the execution of the APP according to an embodiment of the present invention.

Referring to FIG. 4, FIG. 4 is a flow chart illustrates an execution process of the APPs according to an embodiment of the present invention. Firstly, in step S410, the television apparatus receives a channel selecting instruction sent by users and switch the current channel to a selected channel according to the channel selecting instruction. Sequentially, in step S420, the newly switched channel is determined whether it is an APP channel or a physical channel. If the newly switched channel is a physical channel, the television apparatus is then switched to the selected physical channel and displays the television program of the newly switched channel as step S430. Relatively, if the newly switched channel is an APP channel, a time counting operation is activated as step 440. In step S450, if a confirm instruction sent by user is received by the television apparatus, the APP corresponding to the newly switched channel will be launched into execution immediately. Further, if a predetermined time period elapses after the channel is switched according to the time counting operation and the user does not further switch the channel (step S460), the television apparatus will automatically launch and execute the APP corresponding to the newly switched channel immediately as illustrated in step S470.

The aforementioned predetermined time period can be set manually by the designer or manufacturer of the television apparatus, or by the user via a setting interface provided with the television apparatus. The design of the predetermined time period is aimed to avoid wasting system resources of the television apparatus on executing unwanted APPs. When the APP channels is constantly switched or selected by the user, system resources will be wasted without the predetermined time period because the television apparatus constantly launches the APPS and ends execution following the instructions from the user, especially when the user constantly operates the previous channel (Channel Up) or next channel (Channel Down) button on the remote controller. Therefore, by setting the predetermined time period, the television apparatus will only launch the APP corresponding to the newly switched channel when the television apparatus stays at the APP channel for the predetermined time period with no further channel switching. The user may also press a button on the remote controller to send a confirmation signal to launch the APP corresponding to the newly switched channel so as to skip waiting for the predetermined time period. Additionally, when a valid confirmation signal is received by the television apparatus, the time counting operation of step S440 stops and the time counter is thereof reset. Further, the television apparatus may also be set optionally as the following: when the user enters a channel number to select a desired channel, the system of the television apparatus will instantly launch the selected APP without waiting for the confirmation signal or over the predetermined time period, so the television apparatus will only wait for the predetermined time period when receiving other channel switching instructions, such as Channel UP or Channel Down instructions.

Figure 5:
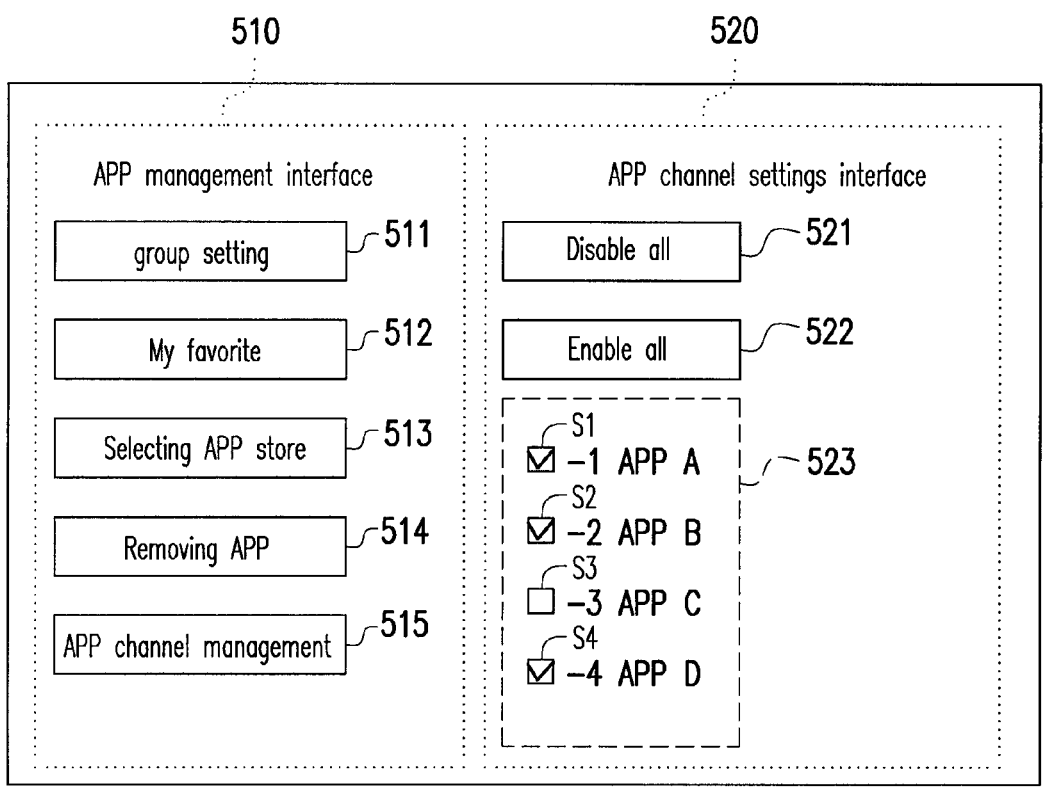
FIG. 5 is a diagram illustrating a user interface 500 of the television apparatus according to an embodiment of the present invention.

Please referring to FIG. 5, FIG. 5 is a diagram illustrates an user interface 500 of the television apparatus according to an embodiment of the present invention. The user interface 500 provides a plurality of setting options which are related to the APPs to the users. The user interface 500 includes an APP management interface 510 and an APP channel setting interface 520. The APP management interface 510 includes menu icons 511 to 515, which are respectively referred to "Group setting", "My favorite", "Selecting APP store", "Removing APP" and "APP channel management" functions. For example, when the menu icon 514 "Removing APP" is selected, the television apparatus provides a list of installed APPs for selections, and then one or more of the APPs selected by the users will be uninstalled from the television apparatus and removed from the channel list. Furthermore, the television apparatus may be set to re-arrange the order of remaining APPs in the channel list based on the order of installations. In other words, after removing the selected APPs, the sequence of the remaining APPs in the channel list can be maintained as the original list with the channels corresponding to the selected APPs removed, or rearranged as a new channel list with new channel numbers mapped to the remaining APPs.

Relatively, when the menu icon 513 "Selecting APP store" is selected by the user, the television apparatus will connect to the APP store, install new APP selected by the user, add the new installed APP to the channel list, and arranging the channel list of the APPs according to the order of their installations.

The APP channel setting interface 520 is displayed after the menu icon 515 "APP channel management" is selected. The APP channel setting interface 520 provides settings for hiding or displaying the APPs in the channel list. In more details, selecting the menu icon 521 "Disable All" of the APP channel setting interface 520 will disable all of the APP channels in the channel list, which is equal to the traditional mode channel list, so users cannot switch to the APP channels. Selecting menu icon 522 "Enable All" of the APP channel setting interface 520 will enable all of the APP channels in the channel list, which is equal to the comprehensive mode channel list, so users can switch to the APP channels. In order to selectively disable or enable a specific APP channel in the channel list 523, users can select or unselect one of the checking boxes S1 to S4 corresponding to the specific APP channel and installed APP. In an example of the present embodiment as shown in FIG. 5, the checking boxes S1, S2 and S4 are selected by the user while the checking box S3 is not selected, which will result the APP channels of APP A, APP C and APP D are enabled in the channel list and APP B is disabled. Therefore, the APP channel of the APP B is disabled and hided in the channel list.

Furthermore, in order to implement a rating system for APPs which prevents unauthorized access of underage users similar to parental control of television programs, at least one of the installed APPs can be set to be monitored according to one of the present invention's embodiments. In this case, violence chip (V-Chip) information will be added to the monitored APP so the authority for accessing the monitored APP can be restricted by the parent or guardian of the underage users. The authority for accessing the monitored APPs can only be obtained by passing the authentication request, such as entering a correct password or other known authentication processes. The access to the adult content in the monitored APP will be blocked if the authentication request is not passed. In another embodiment of the present invention, users are requested to provide their identifications to pass a qualification request, so as to prevent unqualified users from launching the APPs.

Figure 6:
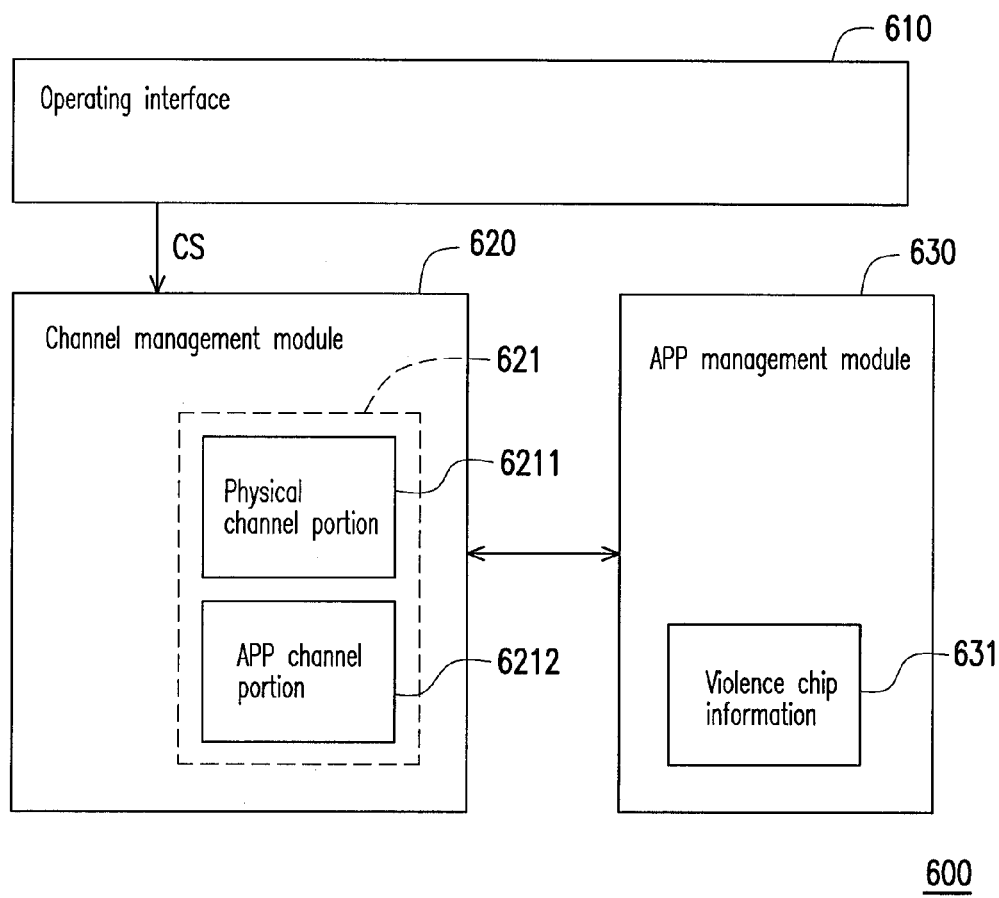
FIG. 6 is a diagram illustrating a television apparatus according to one embodiment of the present invention.

Referring to FIG. 6, FIG. 6 illustrates a diagram of the software architecture in a television apparatus 600 according to an embodiment of the present invention. The television apparatus 600 includes an operating interface 610, a channel management module 620 and an APP management module 630. The operating interface 610 provides a channel selecting instruction CS to the channel management module 620. The channel selecting instruction CS can be an instruction of selecting a specific channel directly, switching to a successive previous channel or next channel, or other possible channel switching instructions. The channel management module 620 is coupled with the operating interface 610 to receive the channel selecting instruction CS. The channel management module 620 creates the APP channel portion 6212 of the channel list with a plurality of channel numbers corresponding to the installed APPs, wherein the APPs of the APP channel portion 6212 are arranged in a sequence with channel numbers. The channel management module 620 launches a selected APP among all APPs in the APP channel portion 6212 to execution according to the channel selecting instruction CS and the channel list. The APP management module 630, coupled with the channel management module 620, receives and installs the APPs for execution sequentially.

Furthermore, the channel management module 620 further creates a physical channel portion 6211 of the channel list, wherein the physical channel portion 6211 and the APP channel portion 6212 are combined into the channel list 621. The television apparatus 600 provides the channel list 621 to users so the users can select a physical channel to watch television program or a desired APP to launch.

In addition, the APP management module 630 further includes violence chip information 631 for the corresponding APPs which are under monitored. The violence chip information 631 is used to restrict accessibility of the monitored APP, and the violence chip information 631 can be embedded in an adult content management module of the APP management module 630.

With respect to the detail operation of the television apparatus 600 has been described in detail in the above embodiments and will not be described again herein.

In view of the above, the present invention creates a channel list according to a sequence of the installed APPs, and provides the channel list comprising an APP channel portion and a physical channel portion for users to select a desired channel. As such, users can select and launch the APPs via an operating interface similar to one used for selecting the physical channels. As result, the convenience of operating the television apparatus can be effectively increased.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An operating method for selecting application implemented in a television apparatus, comprising:
   receiving a channel selecting instruction;
   reading a channel list, the channel list includes a plurality of applications (APPs) and a plurality of physical channels corresponding to a plurality of channel numbers, wherein each of the APPs is assigned to one of the channel numbers respectively;
   mapping the channel selection instruction to one of the plurality of channel numbers in the channel list; and
   launching and executing a selected APP if the channel selection instruction is corresponding to the channel number of the selected APP,
   wherein the step for launching and executing the selected APP if the channel selection instruction is corresponding to the channel number of the selected APP comprising:
      activating a time counting operation in response to receiving the channel selecting instruction which is directed to the selected APP;
      if not receiving any channel selecting instruction in a predetermined time period in response to activating the time counting operation, launching the selected APP after the predetermined time period;
      if receiving a confirmation instruction after receiving the channel selecting instruction in response to activating the time counting operation, launching the selected APP and stopping the time counting operation; and
      if receiving a second channel selecting instruction corresponding to another selected APP in the predetermined time period in response to activating the time counting operation, restarting the time counting operation.

2. The operating method as claimed in claim 1, wherein the plurality of channel numbers are assigned to the plurality of APPs according to an order of installations of the plurality of APPs.

3. The operating method as claimed in claim 1, further comprising:
   receiving a mode setting instruction; and
   setting the channel list according to the mode setting instruction, wherein the channel list is set to include or not include the plurality of channel numbers assigned to the plurality of APPs.

4. The operating method as claimed in claim 1, wherein the plurality of channel numbers assigned to the plurality of APPs are negative numbers.

5. The operating method as claimed in claim 1, further comprising:
   determining whether the selected APP is set to be monitored; and
   if the selected APP is set to be monitored, displaying an authentication request according to an authentication setting corresponding to the selected APP.

6. The operating method as claimed in claim 1, further comprising:
   displaying an APP channel setting interface;
   receiving an APP channel setting instruction selecting part of the plurality of APPs; and
   enabling or disabling part of the channel numbers corresponding to the part of the plurality of APPs in the channel list.

7. A television apparatus, comprising:
   a channel management module receiving a channel selecting instruction from an operating interface, the channel management module stores and reads a channel list including a plurality of applications (APPs) and a plurality of physical channels corresponding to a plurality of channel numbers, wherein each of the APPs are assigned to one of the channel numbers respectively; and
an APP management module receiving and installing the plurality of APPs;
wherein the channel management module maps the channel selection instruction to a channel number in the channel list, and if the channel selection instruction is corresponding to the channel number of a selected APP, the channel management module launch the selected APP,
wherein the television apparatus further activates a time counting operation if the received channel selecting instruction is directed to the selected APP;
the channel management module launches the selected APP after a predetermined time period in response to the television apparatus activating the timing counting operation if the television apparatus does not receive any channel selecting instruction in the predetermined time period;
the channel management module launches the selected APP and the television apparatus stops the time counting operation in response to receiving a confirmation instruction within the predetermined time period of the television apparatus activating the time counting operation; and
the television apparatus restarts the timing counting operation in response to receiving a second channel selecting instruction corresponding to another selected APP in the predetermined time period of the television apparatus activating the time counting operation.

8. The television apparatus as claimed in claim 7, wherein the channel management module creates the channel list with the plurality of channel numbers corresponding to the plurality of APPs, and the plurality of channel numbers are assigned to the plurality of Apps according to an order of installations of the plurality of APPs.

9. The television apparatus as claimed in claim 7, wherein the television apparatus further receives a mode setting instruction and sets the channel list according to the mode setting instruction, the channel list is set to include or not include the plurality of channel numbers assigned to the plurality of APPs.

10. The television apparatus as claimed in claim 7, wherein the plurality of channel numbers assigned to the plurality of APPs are negative numbers.

11. The television apparatus as claimed in claim 7, wherein the television apparatus displays an authentication request according to an authentication setting corresponding to the selected APP if the selected APP is set to be monitored.

12. A display system capable of displaying television programs and executing applications (APPs), comprising:
an operating interface;
a channel management module receiving a channel selecting instruction from the operating interface, the channel management module reads a channel list including a plurality of applications (APPs) and a plurality of physical channels corresponding to a plurality of channel numbers, wherein each of the APPs are assigned to one of the channel numbers respectively; and
an APP management module receiving and installing the plurality of APPs, the APP management module storing settings of the plurality of APPs;
wherein the channel management module maps the channel selection instruction to a channel number in the channel list, and if the channel selection instruction is corresponding to the channel number of a selected APP, the channel management module launch the selected APP,
wherein the display system further activates a time counting operation if the received channel selecting instruction is directed to the selected APP;
the display system launches the selected APP after a predetermined time period of activating the time counting operation if the display system does not receive any channel selecting instruction in the predetermined time period;
the display system launches the selected APP, stops the time counting operation, in response to receiving a confirmation instruction within the predetermined time period of the display system activating the time counting operation; and
the display system restarts the timing counting operation in response to receiving a second channel selecting instruction corresponding to another selected APP in the predetermined time period of the display system activating the time counting operation.

13. The display system as claimed in claim 12, wherein the channel management module creates the channel list with the plurality of channel numbers corresponding to the plurality of APPs, and the plurality of channel numbers are assigned to the plurality of Apps according to an order of installations of the plurality of APPs.

14. The display system as claimed in claim 12, wherein the display system further receives a mode setting instruction and sets the channel list according to the mode setting instruction, the channel list is set to include or not include the plurality of channel numbers assigned to the plurality of APPs.

15. The display system as claimed in claim 12, wherein the plurality of channel numbers assigned to the plurality of APPs are negative numbers.

\* \* \* \* \*